United States Patent
Ohzono (10) Patent No.: US 7,300,101 B2
(45) Date of Patent: Nov. 27, 2007

(54) BODY FAIRING ASSEMBLY FOR SCOOTER

(75) Inventor: Gen Ohzono, Iwata (JP)

(73) Assignee: Yamaha Motor Co., Ltd., Shizuoka-ken (JP)

( * ) Notice: Subject to any disclaimer, the term of this patent is extended or adjusted under 35 U.S.C. 154(b) by 0 days.

(21) Appl. No.: 11/232,429

(22) Filed: Sep. 21, 2005

(65) Prior Publication Data
US 2006/0066126 A1     Mar. 30, 2006

(30) Foreign Application Priority Data
Sep. 21, 2004   (JP)   ............................. 2004-273754
Sep. 2, 2005    (JP)   ............................. 2005-254960

(51) Int. Cl.
*B62D 27/00*   (2006.01)
(52) U.S. Cl. ................... 296/191; 296/78.1; 296/181.2
(58) Field of Classification Search ............... 296/78.1, 296/77.1, 181.2, 90.01, 191
See application file for complete search history.

(56) References Cited

U.S. PATENT DOCUMENTS

| | | | | |
|---|---|---|---|---|
| 3,596,979 A | * | 8/1971 | Hablitzel et al. | ........ 296/181.2 |
| 4,066,291 A | * | 1/1978 | Hickman | ................... 296/78.1 |
| 4,515,405 A | * | 5/1985 | Ogishima | ................... 296/78.1 |
| 4,697,842 A | * | 10/1987 | Kawasaki | ................... 296/78.1 |
| 5,603,549 A | * | 2/1997 | Chen et al. | ............... 296/180.1 |
| 6,203,093 B1 | * | 3/2001 | Suzuki et al. | ............... 296/78.1 |
| 6,322,115 B1 | * | 11/2001 | Devilliers | ................... 293/142 |
| 6,349,987 B1 | * | 2/2002 | Boulbon | ................... 296/39.3 |
| 6,460,874 B1 | * | 10/2002 | McDonnell et al. | ..... 280/728.2 |
| 6,595,576 B2 | * | 7/2003 | Mizutani et al. | ............ 296/152 |
| 6,902,185 B2 | * | 6/2005 | North | ....................... 280/728.3 |
| 7,007,998 B2 | * | 3/2006 | Toyofuku | ................... 296/78.1 |

FOREIGN PATENT DOCUMENTS

JP          2963214          8/1999

* cited by examiner

*Primary Examiner*—Dennis H. Pedder
*Assistant Examiner*—Mike Hernandez
(74) *Attorney, Agent, or Firm*—Knobbe Martens Olson & Bear LLP (57) ABSTRACT

A straddle-ride type vehicle (e.g., a scooter) comprises a vehicle cover assembly that includes at least a cover that partially covers the vehicle's body and a rear side cover that covers the cover from the outside of the vehicle body. The cover including a projection at an end thereof that extends toward the rear side cover. This construction of the cover assembly eases the manufacture of the covers and eases the assembly thereof so as to present a high quality of outward appearance without strictly controlling the manufacturing tolerances of the covers.

18 Claims, 7 Drawing Sheets

BODY FAIRING ASSEMBLY FOR SCOOTER

CROSS-REFERENCE TO RELATED APPLICATIONS

The present application is based upon and claims priority under 35 U.S.C. § 119 to Japanese Patent Application No. 2004-273754 and to Japanese Patent Application No. 2005-254960, which were filed on Sep. 21, 2004, and on Sep. 2, 2005, respectively, and which are hereby incorporated by reference in their entirety.

BACKGROUND OF THE INVENTION

1. Field of the Invention

The present invention relates to a straddle-ride type vehicle (e.g., a motor scooter) provided with a vehicle cover that covers a vehicle body and, more particular, to a straddle-ride type vehicle provided with a vehicle cover that comprises a plurality of cover members.

2. Description of the Related Art

Conventionally, in a straddle-ride type vehicle, such as motorcycle, motor scooter, etc., on which an operator straddles a seat and on which two to four wheels support the seat, a vehicle cover often covers a vehicle body. Such covers are widely used to improve the outward appearance of the vehicle and to prevent clothes worn by an operator from becoming dirty.

Since a vehicle body is three-dimensional in shape, such vehicle cover generally comprises a combination of a plurality of cover members. Such covers usually are attached to the vehicle body through the interaction of latch pawls and latch holes. That is, the cover members often include latch pawls and latch holes that lock together to interconnect the cover members. Japanese Patent Publication No. 2963214 discloses an example of such prior assembly (see, for example, pages 3 to 5, FIG. 1 of the publication).

This assembly method largely prevents sizable gaps from occurring between adjacent cover members while ensuring ease in manufacture of the individual cover members and ease in assembling together the cover members. In this manner, it has been possible to improve a quality of outward appearance of a straddle-ride type vehicle, to which a cover is mounted.

SUMMARY OF THE INVENTION

While the conventional cover assembly described above provides good a fit and finish and eases the manufacturing process of the vehicle, an aspect of the present invention involves the recognition that the manner of interlocking the cover members together can be improved. That is, when a cover member is mounted to or dismounted from a vehicle body, a latch pawl or pawls provided on the cover member are in some cases damaged. Also, because the latch pawl is locked into a set position within the latch hole, the dimensions of the cover members needs to be controlled under tight tolerances in order to prevent large gaps from occurring between adjacent cover members. In view of these shortcomings of the prior assembly approach, a need exists for a vehicle cover assembly that can be more easily manufactured and assembled and can provide a high quality outward appearance without strictly controlling the tolerance of the cover members during the manufacturing process.

Accordingly, an aspect of the present invention involves a straddle-ride type vehicle comprising a first cover member and a second cover member. The first cover member partially covers a body of the vehicle. The second cover member covers one end of the first cover member from an outer side of the vehicle body. The first cover member also has, at said one end thereof, a projection that extends toward the second cover member.

The projection, which extends toward the second cover member from the inside so that even when some gap occurs between the first cover member and the second cover member, the projection inhibits the cover members from spreading apart to expose the interior of the vehicle. Additionally, there is no need to provide any latch pawl or pawls on the first cover member and the second cover member. Consequently, the risk of damaging such components is eliminated and the manufacturing tolerances of the covers need not be as tightly controlled.

In a preferred mode, a restriction part is disposed inside and near the one end of the first cover member to restrict separation of the first cover member from the second cover member. The restriction part in some applications can be provided on the second cover member and, other applications, it can be provided on the vehicle body.

By employing one or more of the above-noted features of the cover assembly, it is possible to provide a straddle-ride type vehicle capable of ensuring manufacturing and assembly ease and ensuring a high quality of outward appearance without strictly controlling the manufacturing tolerances of the cover members.

BRIEF DESCRIPTION OF THE DRAWINGS

The above mentioned and other features of the invention described herein are disclosed below with reference to the drawings of preferred embodiments thereof. The embodiments are intended to illustrate, but not to limit the invention. The drawings contain the following seven figures.

DETAILED DESCRIPTION OF THE PREFERRED EMBODIMENTS

An example of an embodiment of a straddle-ride type vehicle according to the invention will be described with reference to the drawings of a motor scooter. While the present invention has particular applicability in this context, it is understood that aspects and features of the present invention can also be used in connection with cover assembly employed on other types of straddle-type vehicles (e.g., motorcycles, motor bike, ATVs, personal watercraft, snowmobile, etc.). Accordingly, the following discussion of the present invention in the context of a motor scooter is merely an example of one possible application therefor.

In addition, the same or similar parts in the following figures are denoted by the same or similar reference numerals. However, it should be kept in mind that the drawings are schematic and ratios of respective dimensions are different from actual ones. Accordingly, specific dimensions should be determined taking the following descriptions into consideration. Also, there are of course included parts, whose dimensional relationships and ratios are different from one another among the figures.

General Construction of Motor Scooter

Figure 1:
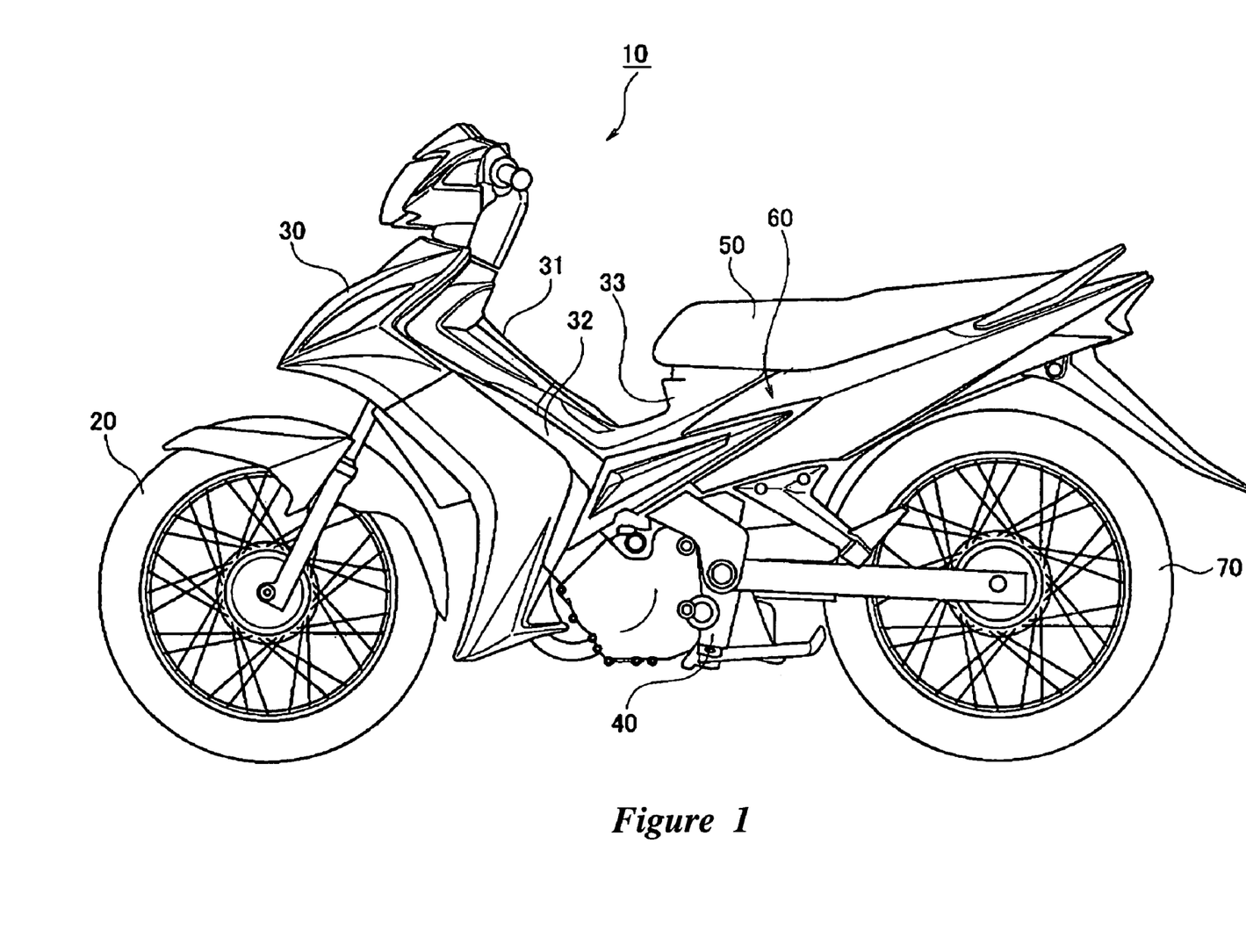
FIG. 1 is a left side view showing a straddle-ride type vehicle in accordance with a preferred embodiment of the present invention.

FIG. 1 is a left side view showing a schematic construction of a motor scooter 10. As shown in the figure, the motor scooter 10 includes a vehicle body 40 formed by an skeleton-type vehicle frame (not shown). Mounted to the body 40 mounts are various functional parts, such as, for example, a front wheel 20, a seat 50, a rear wheel 70, etc.

Also, provided on the motorcycle 10 is a cowling 30 that covers at least a portion of the vehicle body 40 and produces an effect to make an outward appearance look stylish. Further, provided rearward of the cowling 30 is a vehicle cover that covers another portion of the vehicle body 40 for the purpose of an improvement in outward appearance and prevention of clothes worn by a rider (operator) from becoming dirty.

In the illustrated embodiment, the vehicle cover comprises three cover members 31, 32, 33 provided just rearward of the cowling 30 and a side cover 60 that covers left and right sides of the scooter 10. The cover members, 31, 32, 33 preferably are formed from polypropylene (PP) or another suitable lightweight material. The side cover 60 preferably is formed from ABS resin and subjected to a coating, together with the cowling 30.

Construction of Vehicle Cover

Figure 2:
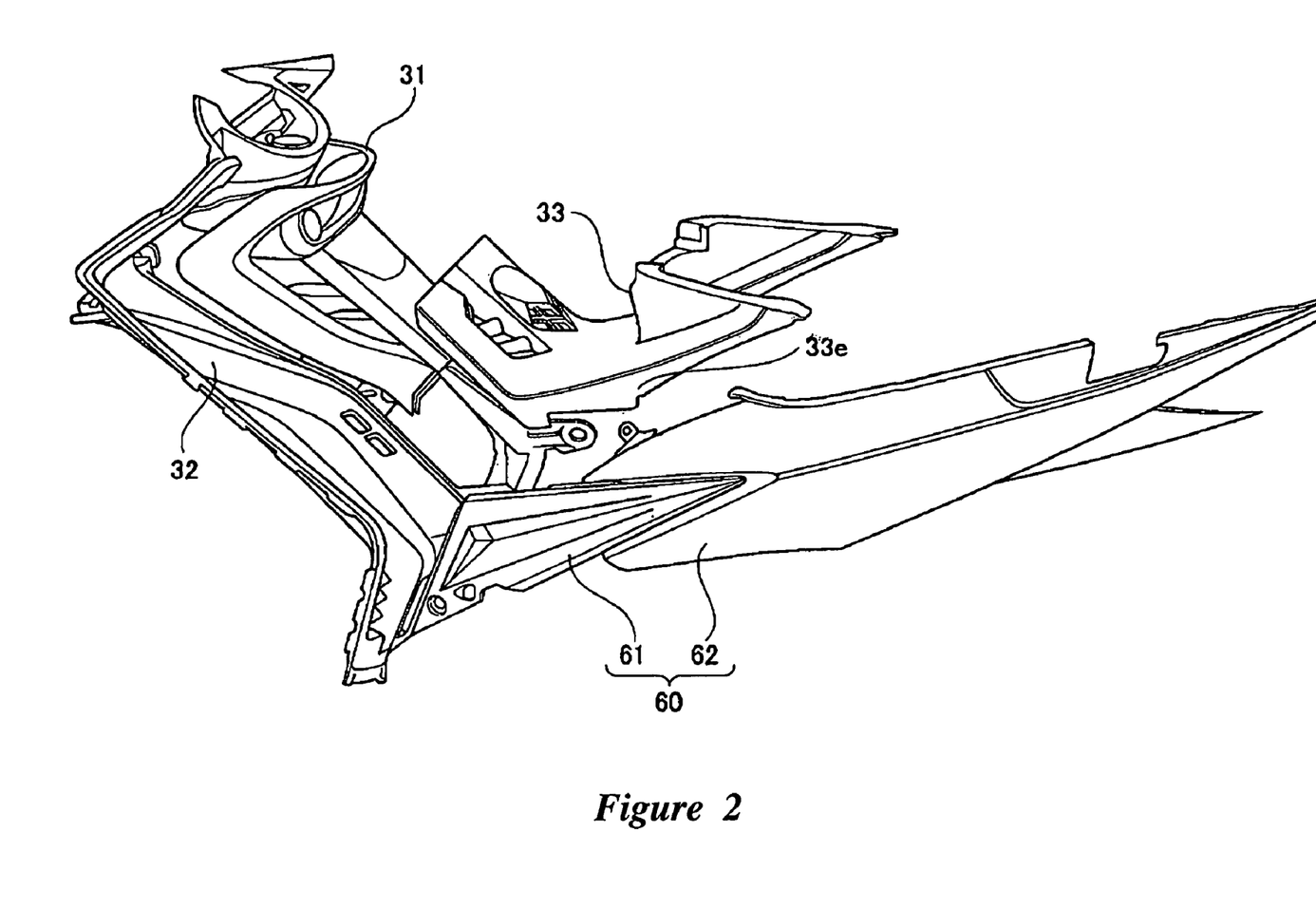
FIG. 2 is an exploded, side perspective view showing a vehicle cover of the vehicle illustrated in FIG. 1.

FIG. 2 is an exploded, perspective view showing the vehicle cover comprising the cover members 31, 32, 33 and the side cover 60.

As shown in the figure, the side cover 60 comprises a front side cover 61 provided toward the front wheel 20 and a rear side cover 62 provided toward the rear wheel 70. In addition, another side cover, which has a substantially symmetrical shape to that of the illustrated left side cover 60, is provided on a right side of the motorcycle 10. Additionally, the following description of the left side cover 60 applies equally to the right side cover, unless noted otherwise or apparent from the context.

The cover members 31, 32, 33 and the side cover 60 are fixed to the vehicle body 40 (not shown in FIG. 2) or to another cover. Also, the side cover 60 is configured to be positioned outwardly of the adjacent covers 32, 33 on the vehicle body 40.

In the illustrated embodiment, the cover member 33 and the side cover 60 constitute a first cover member and a second cover member that partially covers the vehicle body 40. Also, the side cover 60 (and more specifically, the rear side cover 62) covers an end 33e (one end) of the cover member 33 from the outer side of the vehicle body. Additionally, other covers and/or cover members of the cover assembly can similarly cooperate with each in accordance with an assembly technique of the present invention.

Figure 3:
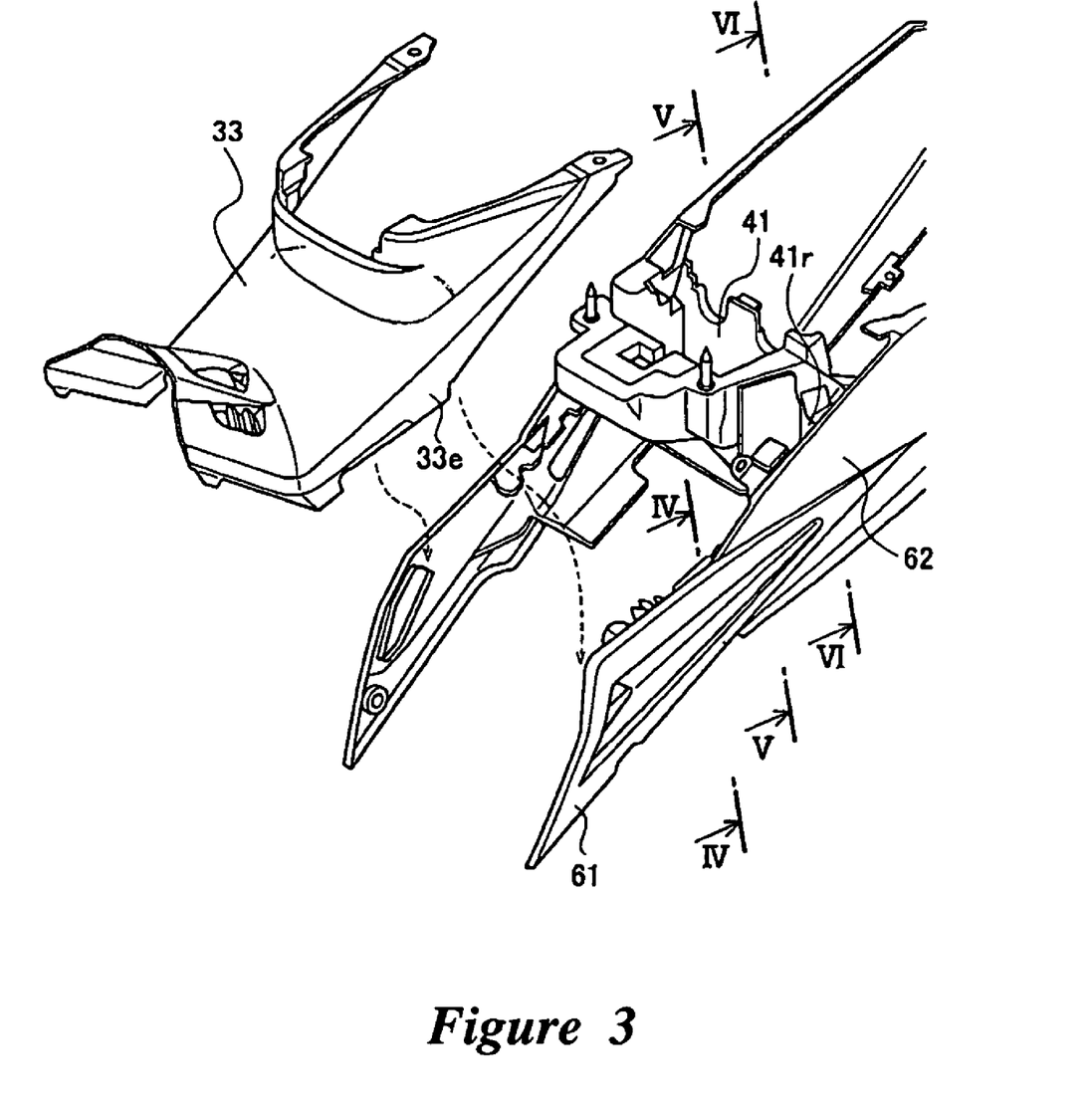
FIG. 3 is a partially exploded, top perspective view of the vehicle cover of FIG. 2.

FIG. 3 is an exploded, perspective view showing the cover member 33 and the side cover 60 (the front side cover 61 and the rear side cover 62). As shown in the figure, the front side cover 61 and the rear side cover 62 are configured to cover the cover member 33 (including the end 33e) from the outer side of the vehicle body and to overlap the end 33e. The term "overlap" as used herein includes a state in which the front side cover 61 (or the rear side cover 62) contacts with the cover member 33 (or the end 33e, respectively) or a state in which the front side cover 61 (or the rear side cover 62) and the cover member 33 (or the end 33e) are arranged to lie in close proximity with each other so as to make it difficult to see through a space between the covers and recognize an interior of the vehicle body 40.

In the illustrated embodiment, a battery box 41, which forms a portion of the vehicle body 40, is provided inside the cover member 33, the front side cover 61, and the rear side cover 62. Further, a restriction part 41r is provided on a side of the battery box 41 to restrict separation of the cover 33 from the rear side cover 62.

Mounting of the Cover Members

Figure 4:
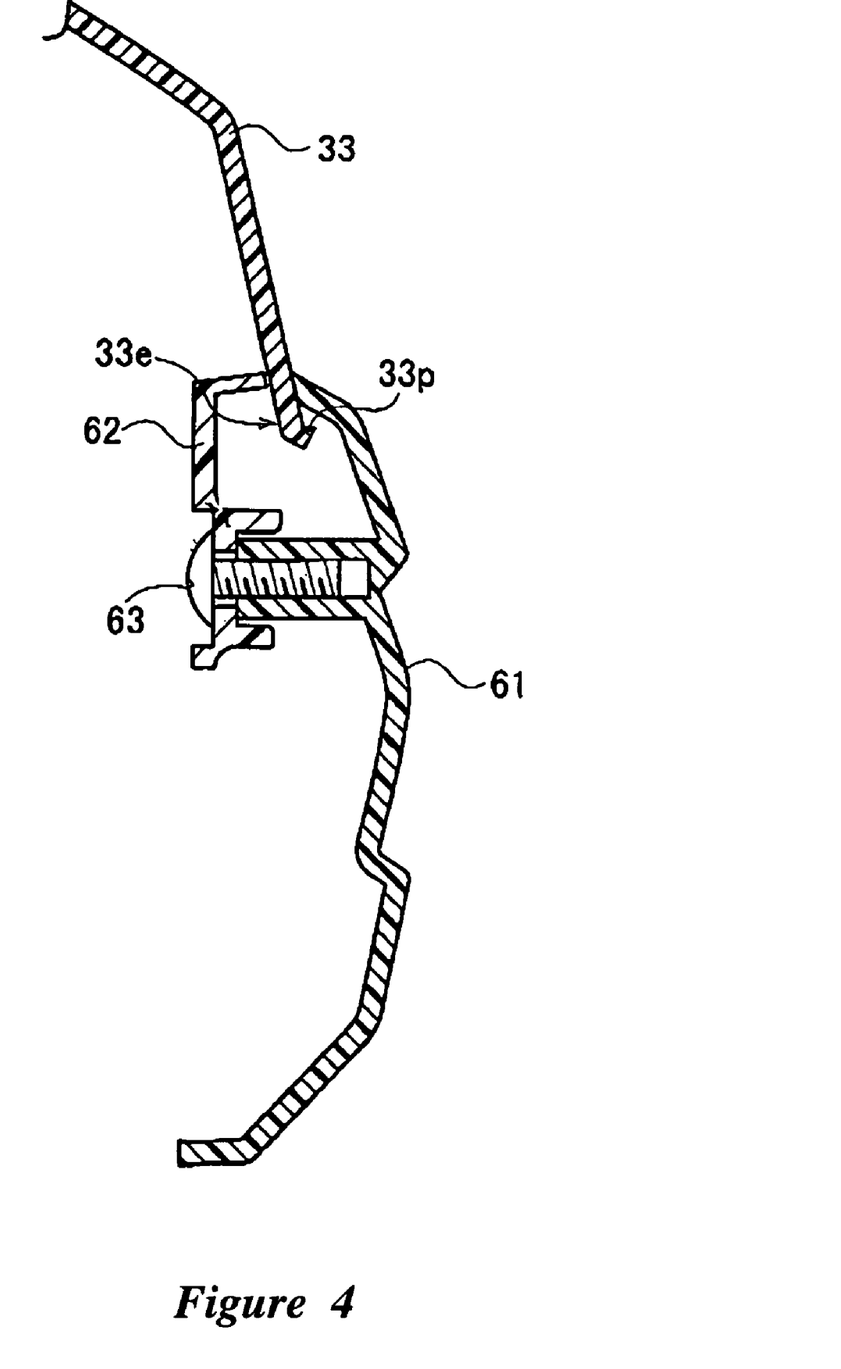
FIG. 4 is a partial, cross-sectional view taken along line IV-IV of the vehicle cover in FIG. 3.
Figure 5:
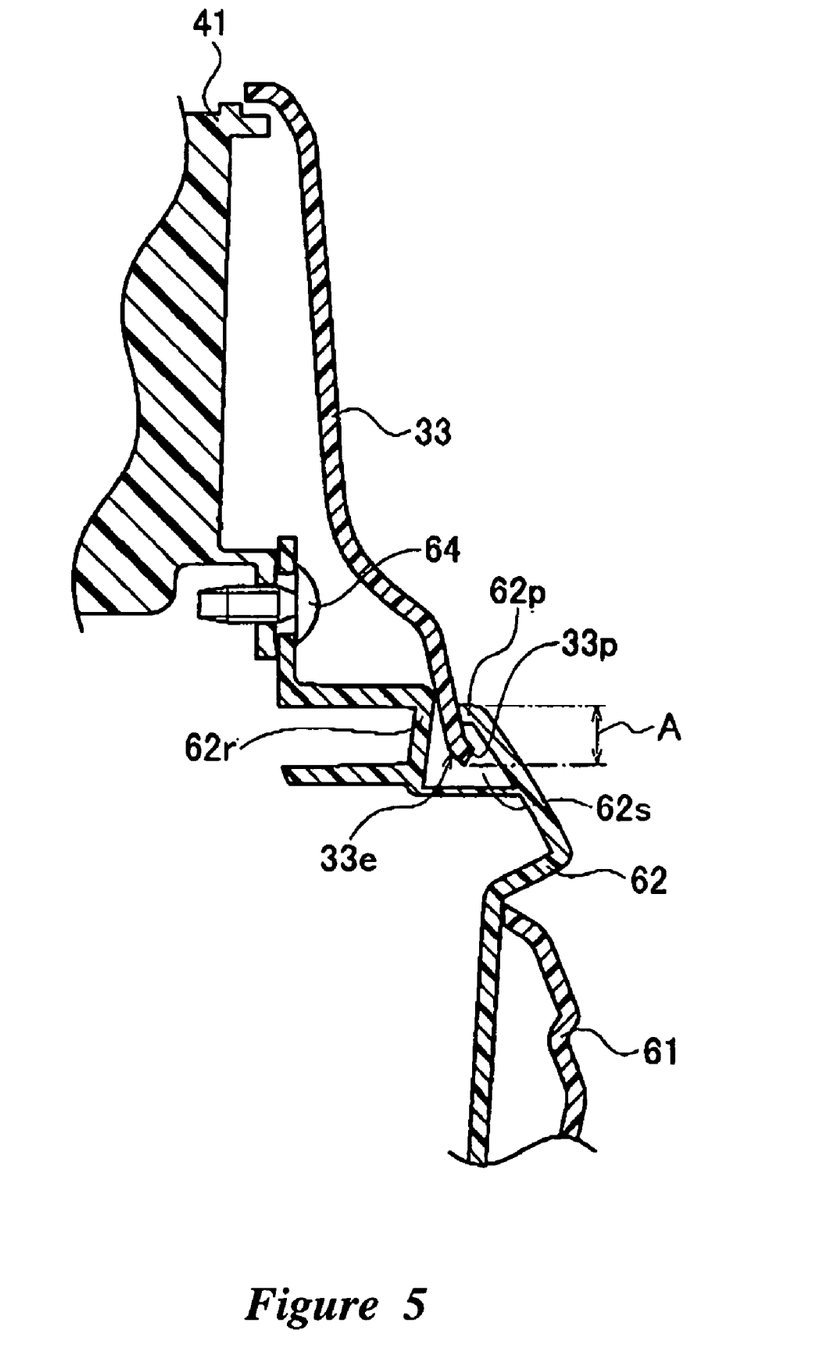
FIG. 5 is a partial, cross-sectional view taken along line V-V of the vehicle cover in FIG. 3.
Figure 6:
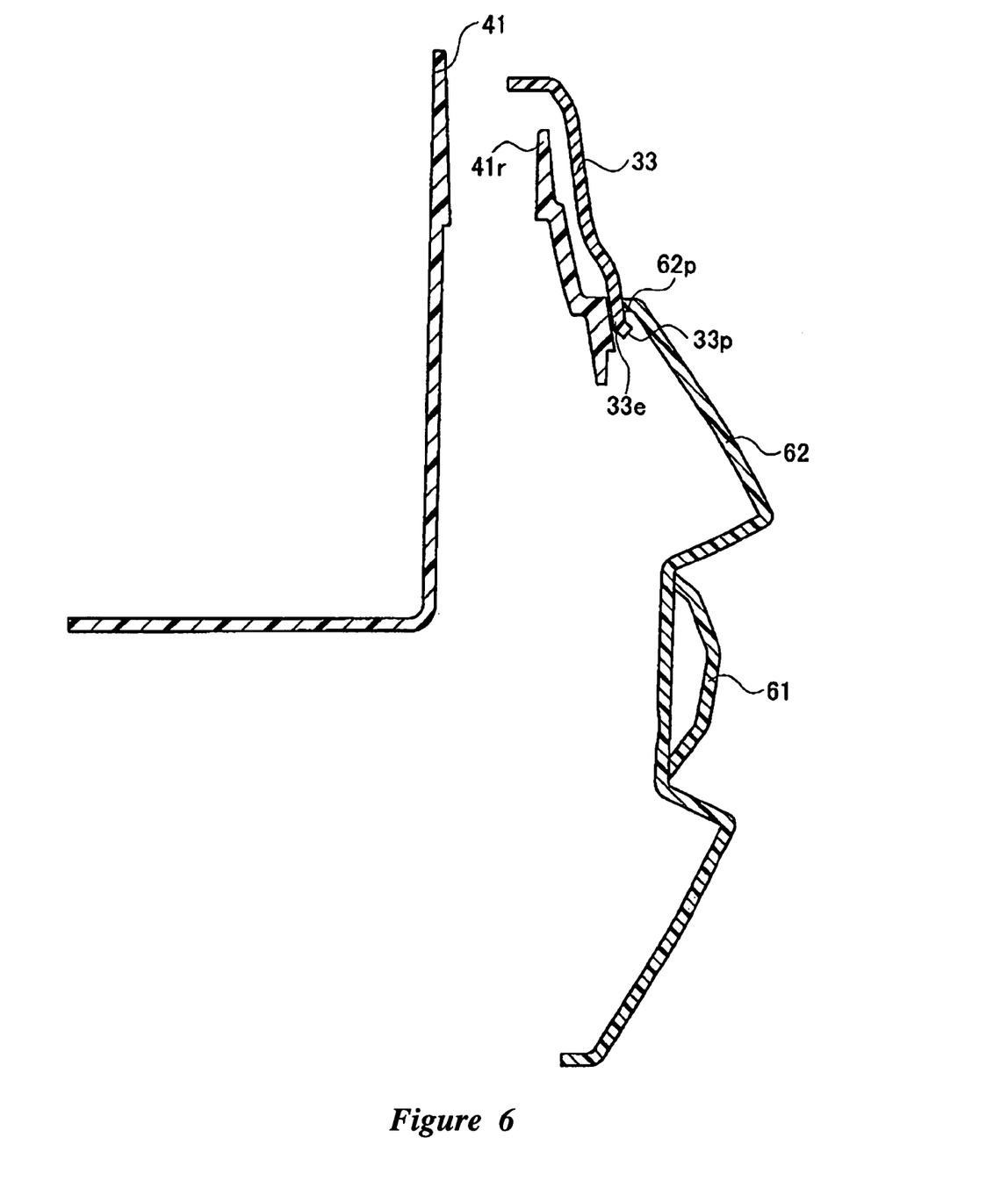
FIG. 6 is a partial, cross-sectional view taken along line VI-VI of the vehicle cover in FIG. 3.

FIGS. 4 through 6 illustrate the cover member 33 and the side cover 60 mounted onto the vehicle body 40 and engaged with each other. In these figures, the cover member 33 and the side cover 60 constitute two cover member that are connected together in accordance with an aspect of the present invention. However, it should be understood, as noted above, that other cover members of the cover assembly can also be connected together in a similar manner to that now described.

As shown in FIG. 4, the front side cover 61 is mounted in a manner that covers the cover 33 from an outer side of the vehicle to partially overlap the end 33e of the cover 33. The cover 33 includes, at an end 33c, a projection 33p. The projection 33p extends toward the front side cover 61. Also, the front side cover 61 is fixed to the rear side cover 62 by screws 63.

With reference now to FIG. 5, the rear side cover 62 is mounted in a manner to cover the cover 33 from the outer side of the vehicle, specifically from outside the battery box 41 to partially overlap the end 33e of the cover 33. Also, as shown in the figure, the front side cover 61 is configured to be positioned outside of the rear side cover 62, as seen in the cross-section taken along line V-V of FIG. 3 (as seen in FIG. 5). The cover 33 includes, at the end 33c, a projection 33p extending toward the rear side cover 62.

The rear side cover 62 preferably includes a restriction part 62r that restricts separation of the cover 33 from the rear side cover 62. In the illustrated embodiment, the restriction part 62r is provided integral with the rear side cover 62; however, in other variations, the restriction part 62r can be attached to the side cover 62 by suitable means (e.g., mechanical or chemical affixation). As seen in FIG. 5, the restriction part 62r extends from the side cover 62 inwardly toward the battery box 41 of the vehicle body 40 and preferably is fixed to the vehicle body 40 (e.g., to the battery box 41 by a screw 64).

The restriction part 62r defines a space 62s (a predetermined space) that allows movements of the cover 33 within an overlapping region A. As seen in FIG. 5, the overlapping region A is the degree of overlap between the end 33e and the rear side cover 62 in a plane (e.g., a generally upstanding plane in the figure). The allowed relative movement is such that the overlapping region A can be enlarged as the end 33e moves within the space 62s (that is, moves downward in the illustrated embodiment). Also, as seen in FIG. 5 the rear side cover 62 includes, at the end 33e, a projection 62p extending toward the cover 33.

As seen in FIG. 6, which is a partial, cross-sectional view taken along line VI-VI of FIG. 3, the rear side cover 62 is mounted in a manner to cover the cover 33 from the outside of the vehicle and to partially overlap the end 33e of the cover 33 in the same manner as shown in FIG. 5. Also, the front side cover 61 is configured to be positioned outside of the rear side cover 62 as seen in FIGS. 5 and 6.

The restriction part 41r extends from the battery box 41 and acts as a backer that restricts inward movement of the cover member 33 to inhibit separation of the cover 33 from the rear side cover 62. At this location, the restriction part 41r projects beyond the rear cover 62 into a space within the cover member 33 (i.e., a space interposed between the cover member 33 and the vehicle body 40). Also, the rear side cover 62 includes the projection 62p that extend toward the cover 33 in the same manner as shown in FIG. 5.

As described above, the projection 33p provided at the end 33e of the cover 33 preferably is provided to be continuous at least along the edge which extends between line IV and line VI shown in FIG. 3. Also, the projection 62p provided on the rear side cover 62 preferably is provided to be continuous at least along the section between line V and line VI shown in FIG. 3; however, in some variations, the projection 62p can be interrupted along this section of the side cover 62. In the illustrated embodiment shown in FIG. 6, the cover 33 (the end 33e) and the rear side cover 62 are skewed with respect to one another and, consequently, the projection 62p can be easily provided along the entire section.

Function and Effect

With the scooter 10 (the vehicle cover), according to the embodiment, described above, the projection 33p extending toward the rear side cover 62 is provided on the cover 33 positioned inside the vehicle body 40. So even when some gap occurs between the cover 33 and the rear side cover 62, it is possible to inhibit separation between the covers to a degree where an interior of the vehicle body 40 can be visually recognized through the resulting gap.

Also, with the scooter 10, there is no need of providing any latch pawl or pawls on the cover 33 and the rear side cover 62, so that it is possible to lessen that frequency, in which the cover 33 and the rear side cover 62 are damaged. Further, since these covers include no latch pawl or pawls, it is possible to avoid a state in which the cover 33 or the rear side cover 62 is mounted to the vehicle body 40 in a twisted state. Consequently, it becomes unnecessary to strictly control the manufacturing tolerances of the cover members unlike the case of covers with a latch pawl or pawls.

Further, since the restriction part 41r and the restriction part 62r are provided to restrict separation of the cover 33 from the rear side cover 62, these components of the cover assembly makes it possible to prevent enlargement of a gap between the cover 33 or the rear side cover 62. Also, since the restriction part 62r is provided integral with the rear side cover 62, it is possible to reduce manufacture of the rear side cover 62 in cost and man-hours required in assembling the rear side cover 62.

Additionally, it is possible to simplify the shape of the rear side cover 62 because the restriction part 41r is provided on a side of the vehicle body 40 (specifically, the battery box 41). That is, in the case where a restriction part for restriction of separation of the cover 33 from the rear side cover 62 is provided integral with the rear side cover 62, a forming die for the rear side cover 62 needs a slide core in some cases but the restriction part 41r is made separate to thereby avoid the use of any slide core for the forming die. Also, since the restriction part 62r extends inwardly and is fixed to the vehicle body 40, it is possible to readily and surely adjust (e.g., decrease) a gap between the cover 33 and the rear side cover 62.

Further, since the restriction part 41r provided on the vehicle body 40 restricts separation of the cover 33 from the rear side cover 62, it is unnecessary to ensure any clearance between the cover 33 and the vehicle body 40 for the purpose of prevention of contact that is, while a certain clearance must be ensured between a conventional cover and a vehicle body so as to prevent contact therebetween due to vibrations upon traveling of a vehicle, such clearance becomes unnecessary, thus enabling improving freedom of design for the appearance and shape of the vehicle (for example, increased sharpness in design lines and a smaller, tighter appearance can be obtained).

Also, with the vehicle 10, since the restriction part 62r defines the space 62s that allows movements of the cover 33 in a direction, in which that overlapping region A can enlarge, it is possible to easily assembly together the cover 33 and the rear side cover 62. Further, since even when a "shift" is caused in the relative mount positions between the cover 33 and the rear side cover 62, the space 62s accommodates such shift. Such shifting thus does not mar or otherwise detract from the appearance of the vehicle.

ADDITIONAL EMBODIMENT

As described above, while contents of the invention are disclosed by way of an embodiment of the invention, it should not be understood that the descriptions and the drawings, which constitute a part of the disclosure, limit the invention. Various alternative embodiments will become apparent to those skilled in the art from the disclosure.

Figure 7:
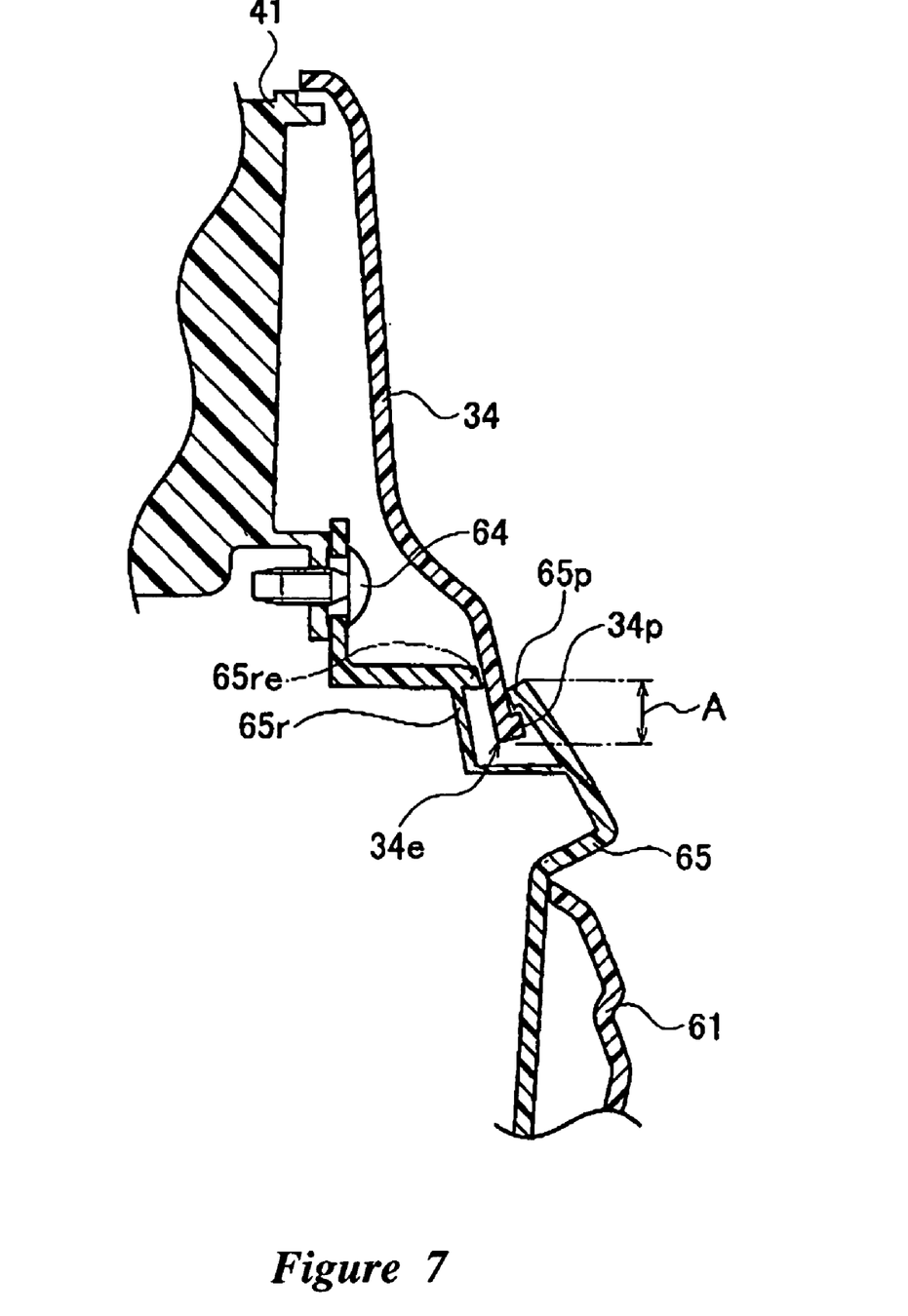
FIG. 7 is a partial, cross-sectional view showing a vehicle cover in accordance with a modified example of an embodiment of the present invention.

For example, the cover 33 and the rear side cover 62 can be modified in the following manner. FIG. 7 is a partial, cross sectional view showing a cover 34 and a rear side cover 65, which can be provided on a motorcycle 10, in place of the cover 33 and the rear side cover 62 according to the embodiment, described above. Specifically, FIG. 7 is a partial, cross sectional view taken from a position corresponding to the cross section along line V-V in FIG. 3. Those portions, which are different from the cover 33 and the rear side cover 62 described above, will be mainly described below.

Provided on the motorcycle 10 are the cover 34 in place of the cover 33, and the rear side cover 65 in place of the rear side cover 62.

The cover 34 is different from the cover 33 in the shape of a projection 34p formed on an end 34e. The rear side cover 65 is different from the rear side cover 62 in the shape of a projection 65p and a restriction part 65r.

Specifically, the projection 34p is more acute in bending angle than the projection 33p. Likewise, the projection 65p is more acute in bending angle than the projection 62p. In addition, while the end 33e of the cover 33 is bent to form the projection 33p, paddings are provided on the end 34e of the cover 34 to form the projection 34p. While the projection 62p of the rear side cover 62 is formed by bending the end in the same manner as the projection 33p, the projection 65p of the rear side cover 65 is formed by providing paddings on the end of the rear side cover 65 in the same manner as the projection 34p.

Also, paddings are provided to form a projection 65re on the rear side cover 65 in the same manner as the projection 34p and the projection 65p.

While the embodiments of the invention described above have been explained by way of a motorcycle 10, the invention is of course applicable to other straddle-ride type vehicles (for example, straddle-ride type vehicles having three wheels and four wheels).

Also, while the embodiments of the invention described above have been explained by way of the cover 33 and the rear side cover 62, the invention is of course applicable to covers provided in other positions.

Further, while according to the embodiment, the restriction parts (the restriction part 41r, the restriction part 62r) are provided in positions shown in FIGS. 3, 5, and 6, the positions of the restriction parts are not limited to the positions in the embodiment.

Although this invention has been disclosed in the context of certain preferred embodiments and examples, it will be understood by those skilled in the art that the present invention extends beyond the specifically disclosed embodiments to other alternative embodiments and/or uses of the inventions and obvious modifications and equivalents thereof. In addition, while several variations of the invention have been shown and described in detail, other modifications, which are within the scope of the invention, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of the present invention herein disclosed should not be limited by the particular disclosed embodiments described above.

What is claimed is:

1. A straddle-ride type vehicle comprising first and second cover members partially covering a vehicle body and lying adjacent to each other to define an exterior surface of the vehicle, the second cover member overlapping one end of the first cover member from an outer side of the vehicle body such that the end of the first cover member and an end of the second cover member can slide relative to each other without forming a gap in the exterior surface of the vehicle between the first and second cover members, the first cover member having at said one end thereof a projection extending toward the second cover member.

2. The straddle-ride type vehicle according to claim 1 additionally comprising a restriction part disposed inside and near the one end of the first cover member to restrict separation of the first cover member from the second cover member.

3. The straddle-ride type vehicle according to claim 2, wherein the restriction part is disposed on the second cover member.

4. The straddle-ride type vehicle according to claim 2, wherein the restriction part is provided on the vehicle body.

5. The straddle-ride type vehicle according to claim 3, wherein the restriction part is extended toward an inside of the vehicle body from the second cover member and fixed to the vehicle body.

6. The straddle-ride type vehicle according to claim 5, wherein an overlapping region occurs where the one end of the first cover member and the second cover member overlap each other, and wherein the restriction part defines a predetermined space that allows movements of the first cover member in a direction in which the overlapping region is enlarged.

7. The straddle-ride type vehicle according to claim 1, wherein the second cover member includes a projection extending toward the one end of the first cover member.

8. The straddle-ride type vehicle according to claim 1, wherein the first and second cover members define substantially planar surfaces.

9. The straddle-ride type vehicle according to claim 1, wherein the first and second cover members define a three-dimensional body panel.

10. A straddle-ride type vehicle comprising first and second cover members at least partially covering a vehicle body and lying adjacent to each other to define an exterior surface of the vehicle, the second cover member being fixed to the vehicle body, the first cover member having an end extending intermediate the vehicle body and the second cover member such that the second cover member overlaps the end of the first cover member and such that the end of the first cover member can slide relative to an end of the second cover member without a gap being formed in the exterior surface of the vehicle between the first and second cover members to expose the vehicle body.

11. The straddle-ride type vehicle according to claim 10 additionally comprising a restriction part disposed inside and near the one end of the first cover member to restrict separation of the first cover member from the second cover member.

12. The straddle-ride type vehicle according to claim 11, wherein the restriction part is disposed on the second cover member.

13. The straddle-ride type vehicle according to claim 11, wherein the restriction part is provided on the vehicle body.

14. The straddle-ride type vehicle according to claim 12, wherein the restriction part is extended toward an inside of the vehicle body from the second cover member and fixed to the vehicle body.

15. The straddle-ride type vehicle according to claim 14, wherein an overlapping region occurs where the one end of the first cover member and the second cover member overlap each other, and wherein the restriction part defines a predetermined space that allows movements of the first cover member in a direction in which the overlapping region is enlarged.

16. The straddle-ride type vehicle according to claim 10, wherein the second cover member includes a projection extending toward the one end of the first cover member.

17. The straddle-ride type vehicle according to claim 10, wherein the first and second cover members define substantially planar surfaces.

18. The straddle-ride type vehicle according to claim 10, wherein the first and second cover members define a three-dimensional body panel.

* * * * *

UNITED STATES PATENT AND TRADEMARK OFFICE
CERTIFICATE OF CORRECTION

| | | |
|---|---|---|
| PATENT NO. | : 7,300,101 B2 | Page 1 of 1 |
| APPLICATION NO. | : 11/232429 | |
| DATED | : November 27, 2007 | |
| INVENTOR(S) | : Gen Ohzono | |

It is certified that error appears in the above-identified patent and that said Letters Patent is hereby corrected as shown below:

In Column 2, line 20, after "and," insert -- in --, therefore.

In Column 6, line 5, delete "contact that" and insert -- contact. That --, therefore.

In Column 7, line 51, in Claim 4, delete "provided" and insert -- disposed --, therefore.

Signed and Sealed this

Twenty-fifth Day of November, 2008

JON W. DUDAS
*Director of the United States Patent and Trademark Office*